June 14, 1949. W. L. SCHLEGEL, JR 2,473,040
BRAKE ROTOR
Filed Aug. 19, 1944 2 Sheets-Sheet 1
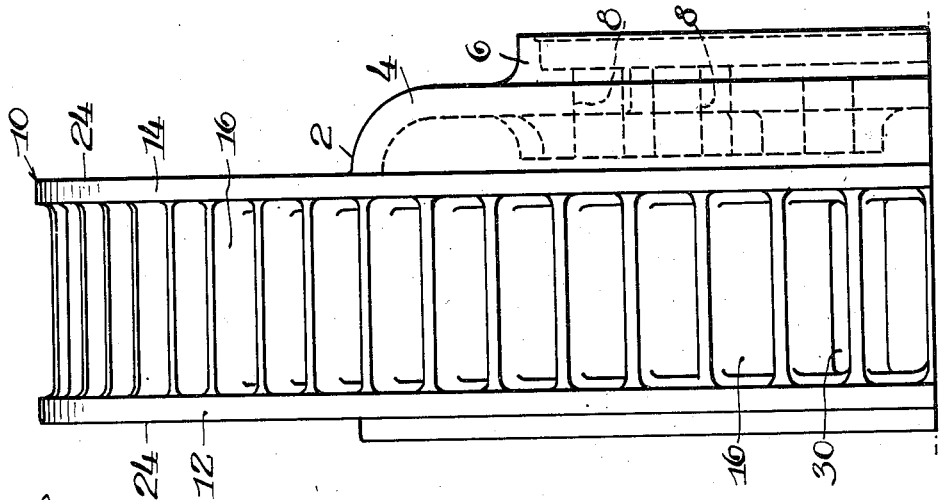
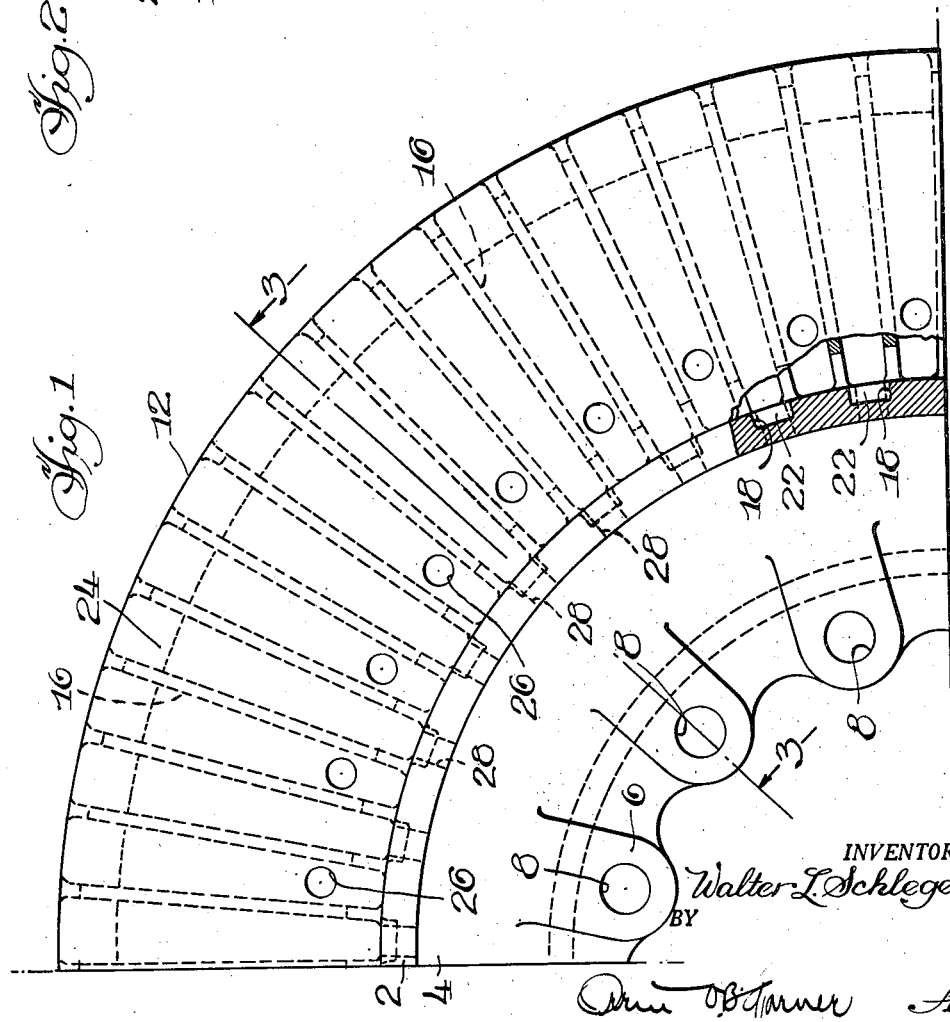
INVENTOR.
Walter L. Schlegel, Jr.
BY
Owen O.B. Tanner Atty.

June 14, 1949. W. L. SCHLEGEL, JR 2,473,040
BRAKE ROTOR
Filed Aug. 19, 1944 2 Sheets-Sheet 2
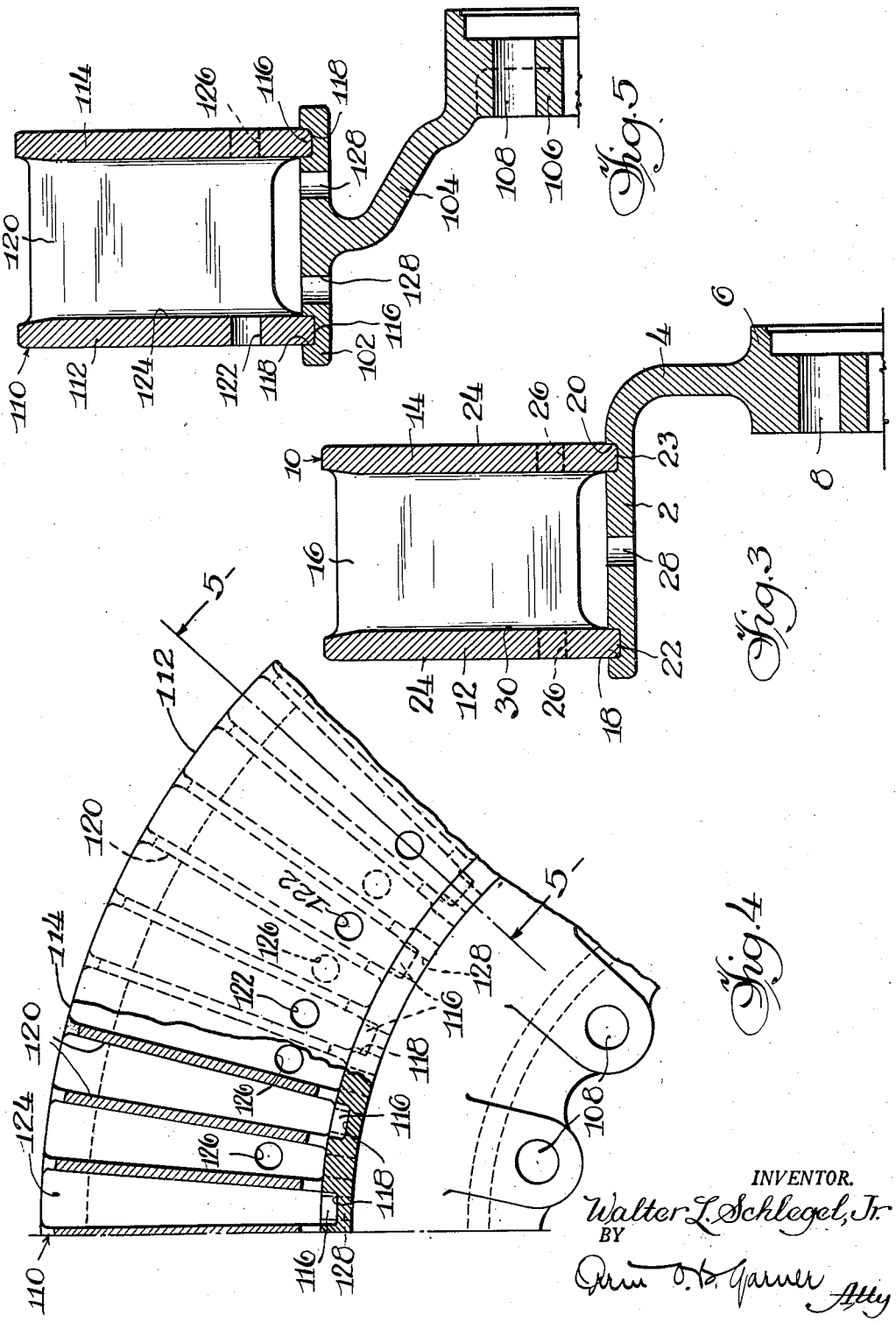

Patented June 14, 1949

2,473,040

UNITED STATES PATENT OFFICE 2,473,040

BRAKE ROTOR

Walter L. Schlegel, Jr., Chicago, Ill., assignor to American Steel Foundries, Chicago, Ill., a corporation of New Jersey Application August 19, 1944, Serial No. 550,197

6 Claims. (Cl. 188—264)

My invention relates to brake equipment and more particularly to a composite brake rotor adapted for connection to an associated rotating member, whereby said member may be decelerated by friction means applied to the rotor.

An object of my invention is to design a rotor such as above described which will function as a centrifugal blower by providing air inlets therein, whereby air may be drawn into a chamber between spaced annular friction plates of the rotor and impelled outwardly by blades extending between the plates.

Another object of my invention is to provide a novel composite brake rotor comprising a cast metal brake ring formed preferably of cast iron so as to secure the advantageous qualities of said metal cast around a substantially cylindrical support member formed of a metal pressing or casting of high tensile strength and shock resisting qualities, said support member being adapted to be attached to an associated rotatable element.

A further object of my invention is to provide a mode of interlocking the brake ring with the cylindrical support member, whereby the former is held from circumferential and axial movement relative to the latter but may expand radially.

In the drawings, Figure 1 is a side elevation, partly in section, of a segment of my brake rotor. Figure 2 is a front elevation, taken from the right as seen in Figure 1. Figure 3 is a sectional view, taken in the radial plane indicated by the line 3—3 of Figure 1.

Figures 4 and 5 show a modification of my novel rotor, Figure 4 being a side elevation, partly in section, and Figure 5 being a sectional view taken in the radial plane indicated by the line 5—5 of Figure 4.

Describing my invention in detail and referring first to the modification shown in Figures 1-3, my novel rotor comprises an annular support member 2 of generally cylindrical shape and provided with an inwardly directed disclike annular flange 4 at one end thereof merging with a hub portion 6, said portion 6 having spaced openings 8 for the reception of means securing the rotor to an associated rotating member.

The brake ring 10, surrounding the support member 2, comprises a pair of spaced annular friction plates 12 and 14 and a plurality of blades 16 extending therebetween. The ring may be cast around the cylindrical support member 2, and, for the purpose of interlocking these members, the member 2 is provided with openings or recesses 18 and 20 formed in the outer perimeter thereof adjacent opposite ends thereof, whereby the metal flowing about the member will enter the recesses and, upon cooling, provide aligned lugs or projections 22 and 23 on the inner perimeter of each plate, said lugs 22 and 23 being disposed within the recesses 18 and 20 of the member 2 and interlocking the ring with said member. The support member is comprised of a metal having a higher tensile strength and lower coefficient of expansion than the metal of the brake ring, and, to this end, the support member may be formed of a steel pressing or casting and the metal forming the brake ring may be cast iron.

It will be apparent that the cast metal forming the brake ring may be cast upon the support member when the latter is cool so that fusing of the ring with the support member is prevented. Also, in the casting operation, the cast metal of which the brake ring is formed will effect a joinder by the interlocking engagement of the lugs 22 and 23 of the plates 12 and 14 and the recesses 18 and 20, whereby circumferential and axial movement of the brake ring relative to the support member is obviated without restricting the radial expansion and contraction of the ring as it heats and cools under service conditions.

As previously noted, the brake ring comprises the friction plates 12 and 14 and each of these plates presents on the outer surface thereof a friction surface 24 for engagement with any suitable braking means, as will be clearly understood by those skilled in the art.

The spaced flat blades 16, extending between the plates 12 and 14, are preferably radially disposed and it will be apparent that the blades serve as columns to resist braking pressures applied to the plates 12 and 14 and, as hereinafter more fully described, said blades also function as blades of a centrifugal blower.

Aligned openings 26, 26 are formed in the plates 12 and 14 adjacent their juncture with the member 2 and a plurality of openings 28, 28 are formed in the member 2 between the plates, all of said openings serving as air inlets and communicating with the chamber 30 (Figures 2 and 3) between the plates 12 and 14. As may be seen in Figure 1, the openings 26, 26 are preferably formed in alternating relationship with the openings 28, 28, whereby a pair of aligned openings 26, 26 are disposed at one side of each of the blades 16 and an opening 28 is disposed at the opposite side of said blade.

It will be understood that by means of this arrangement, air may be drawn into the chamber 30 from both sides of the brake ring and through the member 2 during rotation of the rotor, said air being impelled radially outwardly by means of the blades. The alternating arrangement of the openings 26, 26 and 28, 28 facilitates uniform cooling of the plates 12 and 14 and also tends to prevent deleterious stress concentrations, as may be clearly apparent to those skilled in the art. It may be noted that the openings 26, 26 in the plate 14 afford air inlets in the side of the brake ring adjacent the member to which the rotor is secured by means of the hub portion 6, thus affording air intake from what is frequently a dead air space between the rotor and the associated supporting member.

A modification of my novel rotor is shown in Figures 4 and 5, wherein the annular support member 102, of generally cylindrical form, is provided with the flange or disc 104, the outer periphery of which merges with the support member intermediate the edges thereof and the inner periphery of which merges with the hub portion 106, said hub portion having a plurality of openings 108, 108 therethrough for the reception of means for securing the rotor to an associated rotating member.

The brake ring 110 is cast about the outer periphery of the member 102 in a manner described in the previous modification, each of the spaced annular friction plates 112 and 114 of the brake ring having an inner perimeter providing lugs or projections 116 received within complementary recesses 118 formed in the member 102 adjacent each of the edges defining the outer periphery thereof. Also, a plurality of radially extending blades 120, 120 extend between the spaced plates, said blades corresponding to the blades previously described.

To provide adequate cooling of the plates 112 and 114, the plate 112 is provided with a plurality of openings 122, 122 communicating with the chamber 124 between the plates 112 and 114, and the plate 114 is formed with a plurality of openings 126, 126 communicating with the chamber 124 and preferably alternately arranged with respect to the openings 122, 122, whereby an opening 122 is disposed at one side of each blade 120, 120 and an opening 126 is formed at the opposite side of said blade. The support member is also provided with aligned openings 128, 128 alternately arranged with respect to the blades and communicating with the chamber 124 between the plates 112 and 114 and on opposite sides of the disc 104.

It will be apparent that during rotation of the rotor, air will be drawn into the chamber 124 through all of the openings 122, 122, 126, 126 and 128, 128, and will be impelled outwardly by means of the blades 120, 120, said rotor thus functioning as a centrifugal blower to afford cooling of the friction plates 112 and 114.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake rotor, a substantially cylindrical support member, a brake ring cast about said member and comprising a pair of spaced annular friction plates defining a fluid chamber, and a plurality of blades extending therebetween, each plate having a serrated inner perimeter providing projections radially extending into openings adjacent the outer peripheral edge of said member for interlocking said ring and member, each projection being slidably fitted in the associated opening to permit radial movement of said ring relative to said member and encompassed by the sides of said opening to prevent movement of said ring axially and circumferentially of said member, fluid inlets through said member communicating with said chamber, and fluid inlets through said plates adjacent their juncture with said member, said member having on its inner periphery an annular flange intermediate the edges of said member and connected to a hub member.

2. In a brake rotor comprising a brake ring having two spaced annular friction plates and transverse blades extending therebetween and connecting the same and a cylindrical support member within said ring, the combination of means connecting said member and plates comprising a plurality of projections on each plate on the inner periphery thereof extending radially into spaced holes in the outer circumference of said member spaced from the adjacent edge thereof for interlocking said ring and member, said means being formed and arranged to permit radial expansion and contraction of said ring relative to said member and to prevent relative axial and circumferential movement of said ring and member.

3. In a brake rotor, a substantially cylindrical support member, a pair of spaced annular friction plates each having a serrated inner perimeter providing projections extending into openings in said support member adjacent an outer peripheral edge thereof, each projection being slidably fitted in the associated opening to permit radial movement of said ring relative to said member and encompassed by the sides of said opening to prevent movement of said ring axially and circumferentially of said member, said plates defining a chamber therebetween, spaced blades extending between said plates, a plurality of openings through said member communicating with said chamber, and a plurality of openings through said plates adjacent their juncture with said member, the openings through said plates being in alignment and alternately arranged with respect to the openings through said member.

4. In a brake rotor comprising a brake ring having two spaced annular friction plates and transverse blades extending therebetween and connecting the same, and a cylindrical support member within said ring, the combination of a plurality of openings in said member equidistantly spaced about the outer periphery thereof adjacent each edge thereof and extending radially of said member, and a plurality of lugs on each plate on the inner periphery thereof and extending radially thereof within the adjacent openings, each of said lugs being slidably fitted within the associated opening in said member to permit movement of said ring in a radially outward direction and being encompassed by the sides of said opening to prevent relative circumferential and axial movement of said ring and member.

5. In a brake rotor comprising a brake ring with two spaced annular friction plates and transverse blades extending therebetween and connecting the same and a cylindrical support member within said ring, the combination of a plurality of elements on each plate on the inner periphery thereof and projecting radially inward thereof, openings in said member in the outer periphery thereof adjacent each edge thereof and receiving the adjacent elements therewithin, each of said elements being confined and slidably fitted within the associated openings against movement of said ring axially and circumferentially of said member and accommodating movement of said ring relative to said member in a radially outward direction.

6. In a rotor, a substantially cylindrical support member, a pair of annular friction plates each having a serrated inner perimeter providing projections extending into openings in the outer circumference of said support member, each projection being slidably fitted in the associated opening to permit radial movement of said ring relative to said member and encompassed by the sides of said opening to prevent movement of said ring axially and circumferentially of said member, blower blades extending between said plates, aligned air inlets in said plates at one side of each blade, and an air inlet through said member on the opposite side of said blade.

WALTER L. SCHLEGEL, JR.

REFERENCES CITED

The following references are of record in the file of this patent:

UNITED STATES PATENTS

| Number | Name | Date |
|---|---|---|
| 2,026,263 | White | Dec. 31, 1935 |
| 2,076,538 | Bendix | Apr. 13, 1937 |
| 2,129,199 | Dake | Sept. 6, 1938 |
| 2,162,072 | Eksergian | June 13, 1939 |
| 2,204,807 | McCune et al. | June 18, 1940 |
| 2,255,023 | Eksergian | Sept. 2, 1941 |
| 2,263,945 | Eksergian | Nov. 25, 1941 |
| 2,350,970 | Tack | June 6, 1944 |
| 2,380,085 | Tack et al. | July 10, 1945 |